(No Model.) 5 Sheets—Sheet 1.
L. E. WHITON.
CLUTCH MECHANISM.
No. 564,417. Patented July 21, 1896.
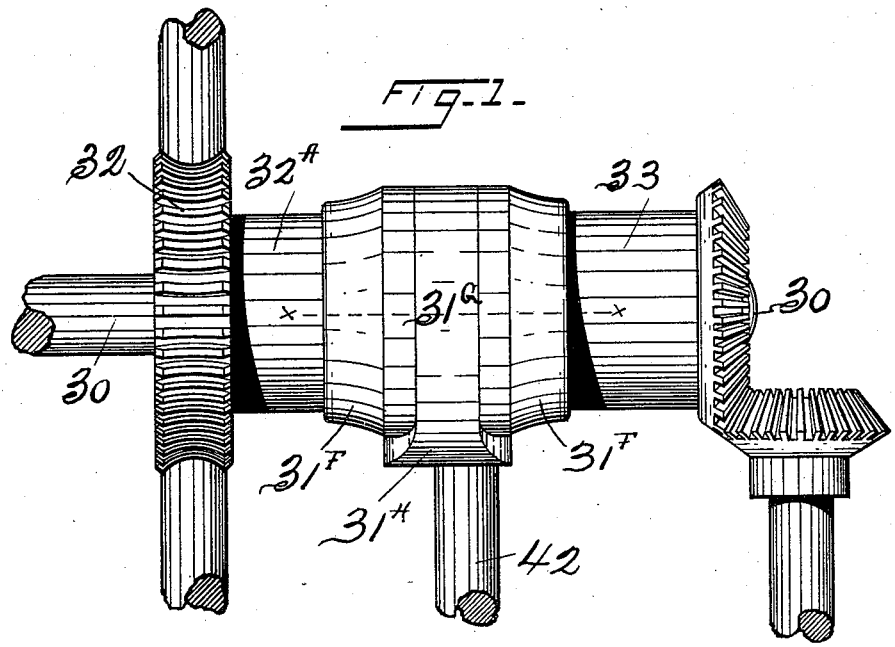
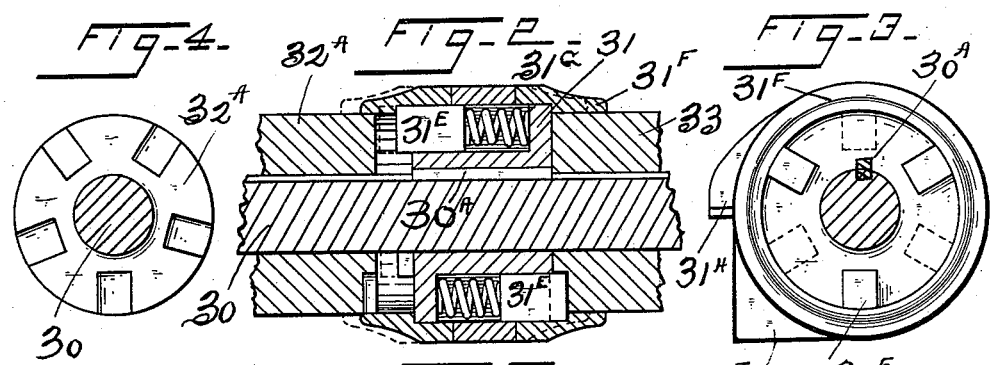
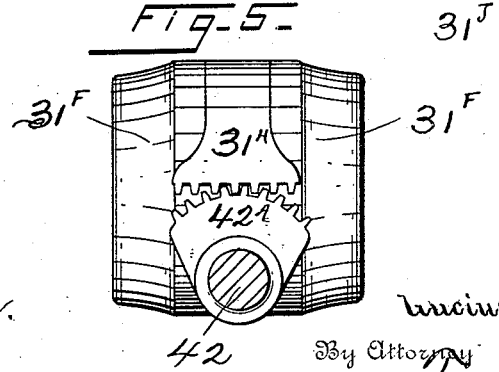
Witnesses
Inventor
Lucius E. Whiton,
By Attorney
Frank H. Allen.

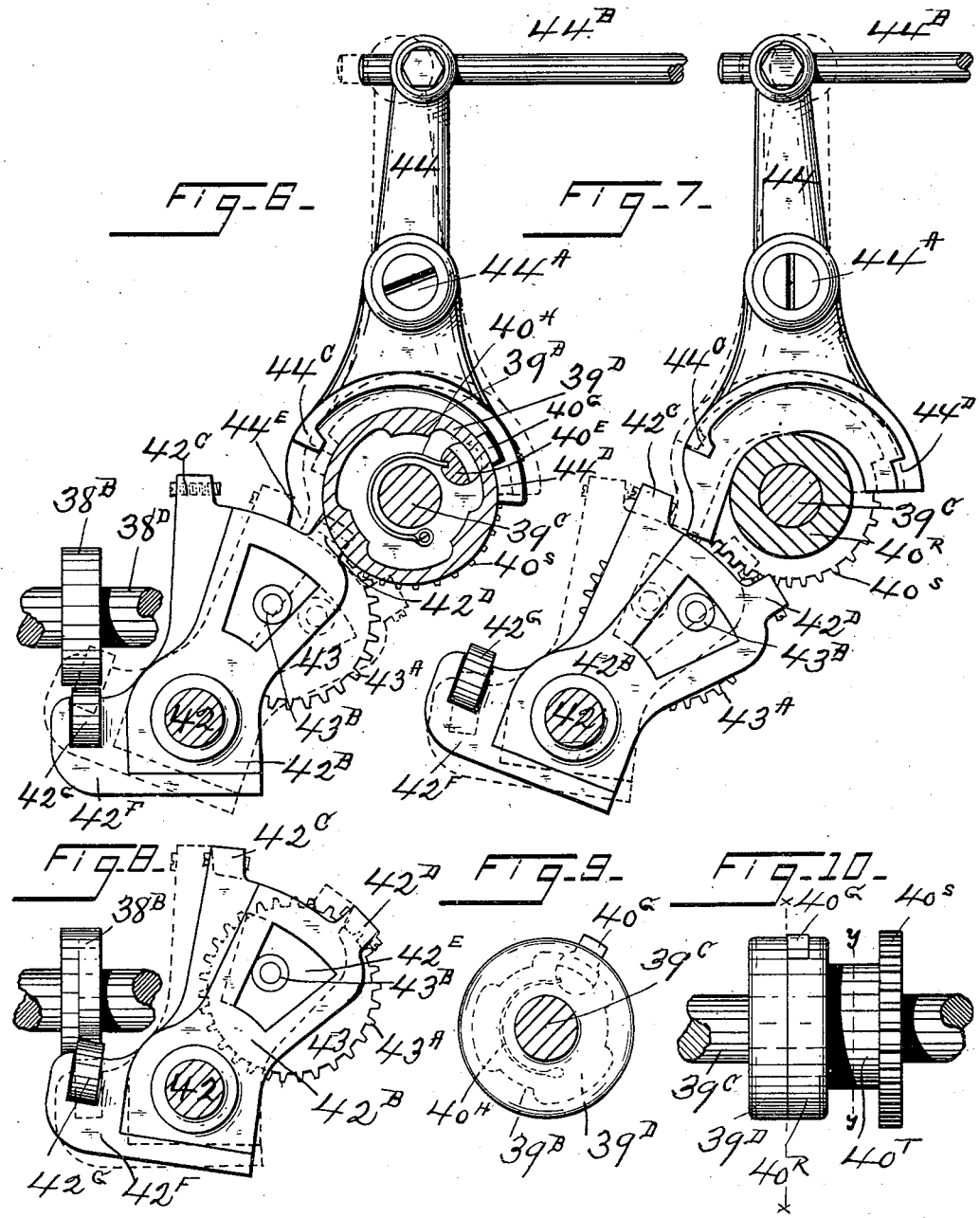

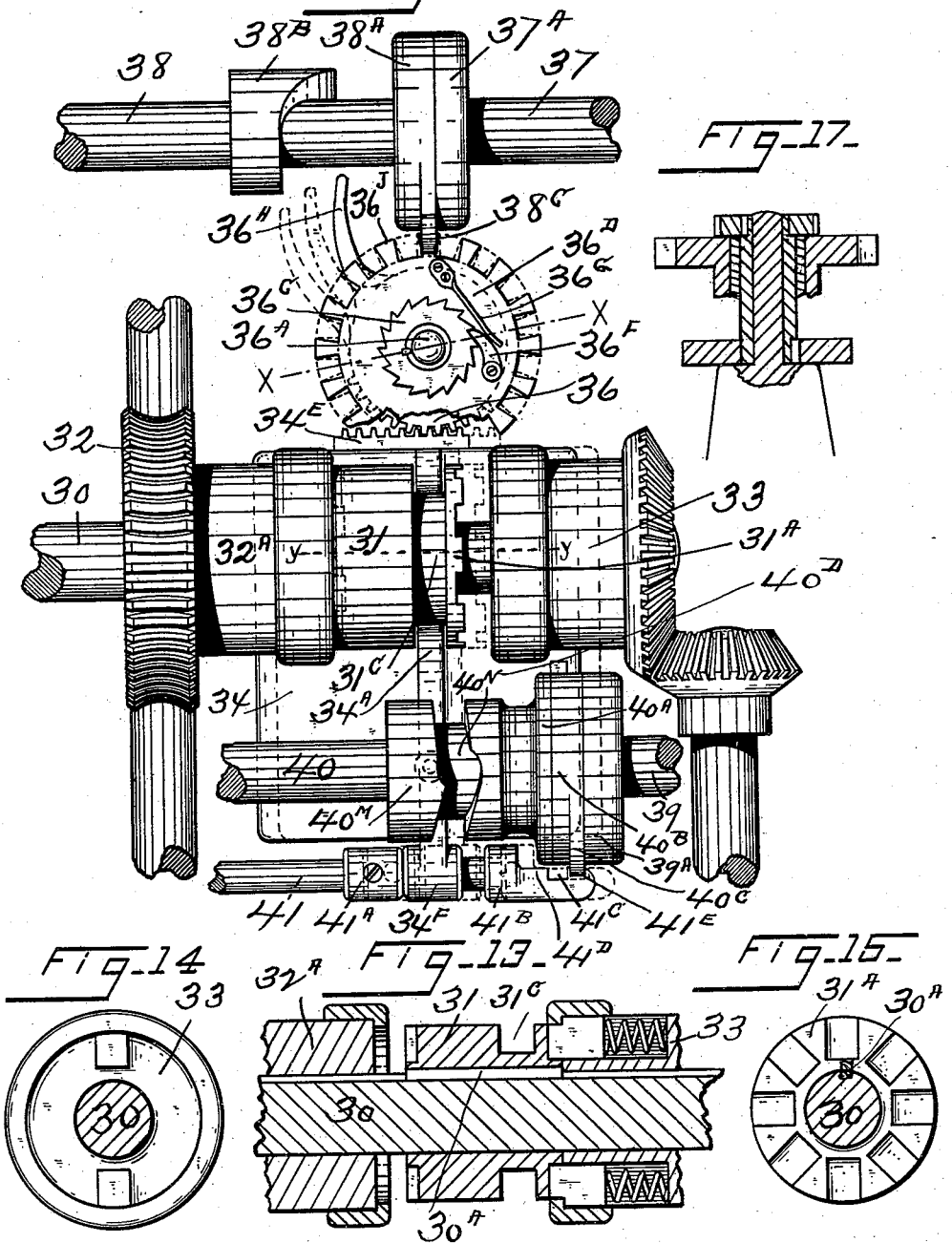

(No Model.) 5 Sheets—Sheet 4.
L. E. WHITON.
CLUTCH MECHANISM.
No. 564,417. Patented July 21, 1896.
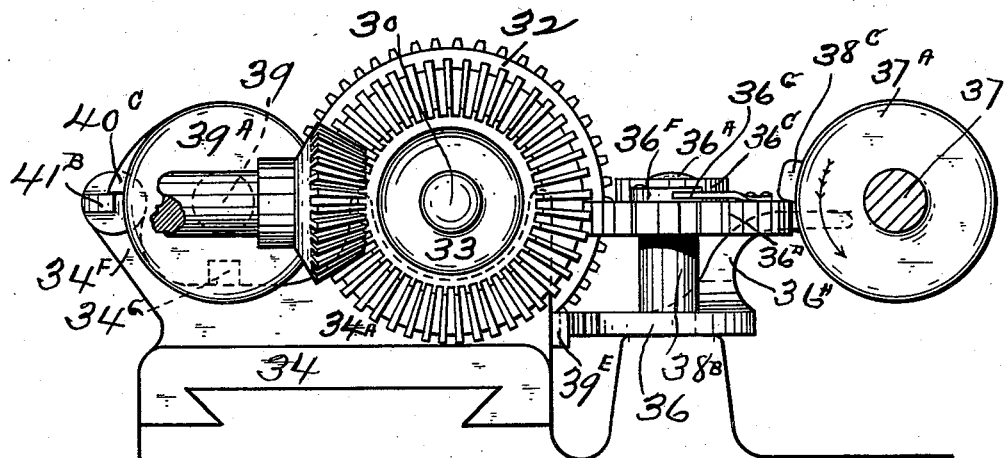
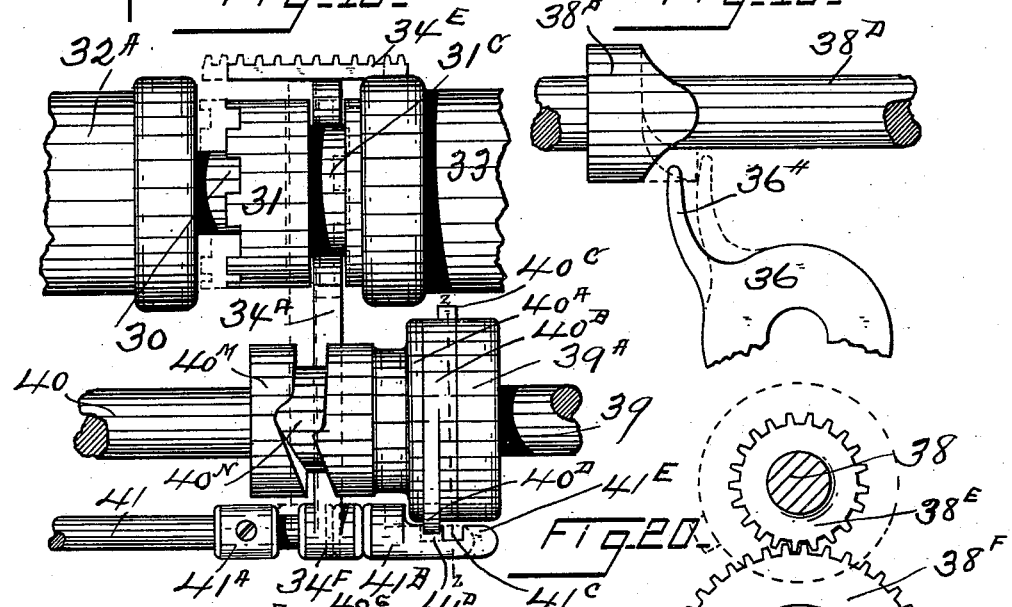
Witnesses
Alonzo H. Luther.
Allen Tenny.
Inventor
Lucius E. Whiton,
By Attorney
Frank H. Allen.

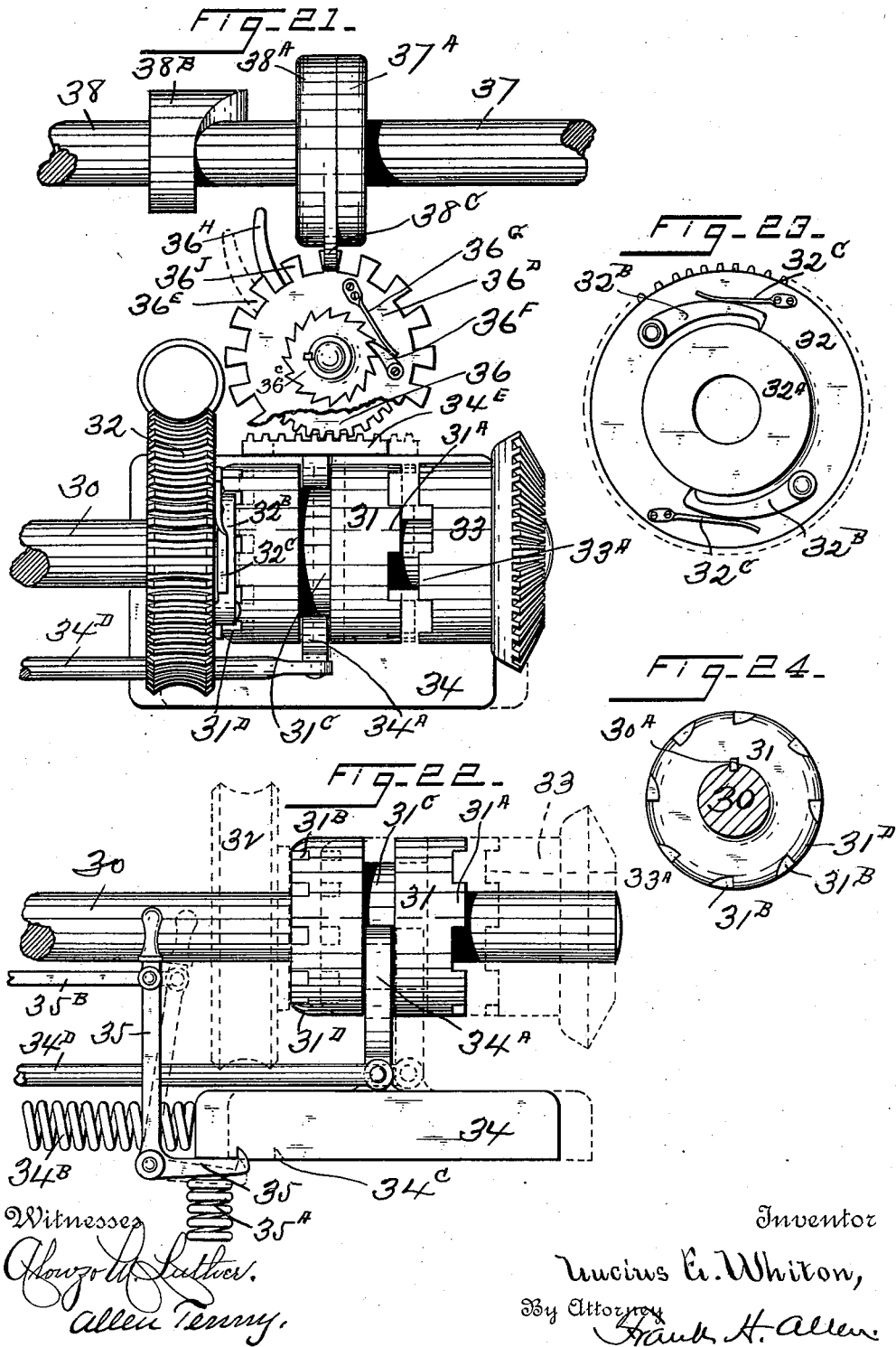

UNITED STATES PATENT OFFICE.

LUCIUS E. WHITON, OF NEW LONDON, CONNECTICUT.

CLUTCH MECHANISM.

SPECIFICATION forming part of Letters Patent No. 564,417, dated July 21, 1896.

Application filed October 15, 1894. Serial No. 525,901. (No model.)

*To all whom it may concern:*

Be it known that I, LUCIUS E. WHITON, a citizen of the United States, residing at New London, in the county of New London and State of Connecticut, have invented certain new and useful Improvements in Clutch Mechanism, of which the following is a specification.

My invention relates to that class of longitudinally-moving clutches having more than one driving-face, which are used for reversing the direction or changing the velocity of the shaft upon which the clutches are mounted, according as the clutch-faces are engaged with different drivers.

My invention has for its object to provide means whereby such clutches may be given a step-by-step sliding movement, so that intentionally designed and prolonged periods of rest in the revolution of the shaft upon which the clutch is mounted may be provided, to allow intervals during which the performance of other functions of the machine of which the improved clutch mechanism forms some part may occur. Heretofore it has been usual to control the automatic action in each direction of such sliding clutches by means of springs, which cause the immediate engagement of the sliding clutch with another of its drivers immediately after the said clutch is released from one of said drivers. In these cases it has not been possible to provide more than momentary periods of rest in the revolution of the shaft upon which the clutch is mounted owing to the continuous passage of the clutch from one driver to another. It is frequently of great importance in the design of special machinery that some driving or feeding shaft shall have a prolonged period of rest in order to permit the performance of some other function of the machine the completion of which shall cause the reëngagement of the clutch with one of its drivers. An embodiment of the principles of my improved clutch mechanism may be found in an automatic gear-cutting machine, as described in my application for patent filed February 28, 1894, Serial No. 501,864, which is one of many possible uses of this improvement in automatically-acting machines.

In the drawings accompanying and forming part of this specification I have illustrated different forms and details of my improved clutch mechanism.

Figure 1 is a plan view of a portion of one form of the mechanism, showing a shaft upon which are mounted clutch-drivers revolving at different velocities and a sliding clutch provided with a rack-section and a rock-shaft provided with a gear-segment for sliding the same. Fig. 2 is a partial longitudinal section on line $x\,x$ of Fig. 1, showing the shaft, the opposite clutch-drivers, the sliding-clutch body, and oppositely-disposed spring-pressed bolts so mounted therein as to provide yielding surfaces for engagement with the respective drivers. Fig. 3 is an end view of the right-hand face of said sliding clutch, showing the rack by which same is moved endwise and the projecting ends of the spring-pressed bolts. Fig. 4 is an end view of the clutch-face of one of the drivers, by means of which said sliding clutch may be caused to revolve. Fig. 5 is a side view of the said sliding clutch, showing its rack-teeth and the gear-segment in engagement therewith by which said clutch is moved. Fig. 6 is a side view of intermittently-acting mechanism for moving the rock-shaft shown in Fig. 1 and is taken in a direction parallel to the axis of said rock-shaft, the sectional view of the intermittent clutch mechanism shown being taken on the line $x\,x$ of Fig. 10. Fig. 7 is a similar view of the same intermittently-acting mechanism, showing it in a different position, the section being taken on the line $y\,y$ of Fig. 10. Fig. 8 is a similar view of a portion of the said mechanism, showing the rock-shaft arm and its operating devices in another position. Fig. 9 is a view of the left-hand end of the intermittent clutch mechanism shown in Fig. 10. Fig. 10 is a side view of the intermittent clutch mechanism shown in section in Figs. 6 and 7. Fig. 11 is a plan view of a modified form of the clutch mechanism, showing primary and secondary cam movements, releasing devices whereby said cam movements may be operated, and a clutch slider or guide in place of the rock-shaft, gear-segment, and rack of Figs. 1 and 5. Fig. 12 is a view of the right-hand end of the mechanism illustrated in Fig. 11. Fig. 13 is a partial longitudinal section on line $y\,y$ of Fig. 11, showing the sliding clutch and the drivers by which same is operated and spring-pressed bolts mounted within one of the driving-clutch hubs to afford yielding engagement with the sliding clutch. Fig. 14 is an end view of the said clutch-hub, showing the projecting ends of the sliding bolts referred to. Fig. 15 is an end view of one of the faces of the sliding clutch, showing notches engaged by the projecting bolts of Figs. 13 and 14. Fig. 16 is a plan view of a portion of the primary-cam mechanism illustrated in Fig. 11, showing this cam mechanism and its releasing device in a different position. Fig. 17 is a sectional view, taken on line $x\ x$ of Fig. 11, showing the method of mounting certain releasing devices which allow the secondary cam to operate. Fig. 18 is a cross-section on lines $z\ z$ of Fig. 16, showing the intermittently-acting mechanism by which the primary clutch-sliding cam is operated. Fig. 19 is a detached view of the secondary cam shown in Fig. 11, by means of which the sliding clutch is given a portion of its movement in one direction. Fig. 20 is a view showing the application of gearing by which the time required for the revolution of the secondary cam shown in Fig. 19 may be varied. Fig. 21 is a plan view of a modified form of the mechanism shown in Fig. 11, in which the primary-cam mechanism for sliding the clutch in one direction is omitted. Fig. 22 is a side view of the mechanism shown in Fig. 21, and also illustrates the application of springs to slide the clutch in one direction in place of the omitted primary-cam mechanism of Fig. 11. Fig. 23 is a face view of the left-hand driving-clutch of Fig. 21, showing pawls by which the sliding clutch is revolved. Fig. 24 is a view of that end of the sliding clutch which engages the face of the driving-clutch shown in Fig. 23.

The working parts illustrated may be mounted in proper working relation in any suitable position upon the framework of the machine in which the improved clutch mechanism is to be utilized. I have deemed it unnecessary to show forms of framing, as such forms may be designed to suit the circumstances by those skilled in the art to which the invention appertains.

In explaining this invention in detail, the simplest form will be first described, as shown in Figs. 21, 22, 23, and 24 of Sheet 5, Figs. 12, 19, and 20 of Sheet 4, and Fig. 17 of Sheet 3.

Referring to Fig. 21, 30 represents the shaft, upon which the clutch 31 is fitted to slide, being prevented from turning independently of the shaft by the spline or feather $30^A$, as shown in Fig. 24, or otherwise. The clutch member 31 is provided at one end with radial clutch-teeth $31^A$ and at the other end with ratchet-teeth $31^B$, (see Fig. 24,) and is also provided with an annular groove $31^C$. 32 is a revolving driver fitted to turn freely upon the shaft 30, and provided with a slightly-projecting hub $32^A$ (see Fig. 23) and pawls $32^B$ of sufficient thickness to project beyond the slightly-raised hub $32^A$. These pawls tend to keep in contact with said hub by the action of springs $32^C$. This revolving driver is shown as a worm-gear, and it is intended to convey only a slow motion to the shaft 30 when clutch member 31 is engaged therewith; but it may be caused to revolve in any other convenient manner. 33 is also a revolving driver mounted to turn freely upon shaft 30, and is provided with projecting radial clutch-teeth $33^A$. 34 is a slider which may be mounted upon any suitably-designed portion of the framework, and is provided with a projecting yoke $34^A$, which engages the annular groove $31^C$ of the clutch member 31. A spring $34^B$ tends normally to move the slider toward the right hand, (see Fig. 22,) but the said slider is restrained by the latch 35, kept normally seated in the recess $34^C$ by the spring $35^A$. A stop-rod $35^B$ is attached to the latch 35, which may be operated by hand or by some portion of the machine of which the clutch mechanism forms part. When the slider 34 is restrained in the left-hand position by the latch 35, clutch-teeth $31^B$ are in engagement with and driven by the pawls $32^B$ of the driver 32. When the slider is in the right-hand position after the release of the latch 35, clutch-teeth $31^A$ are in engagement with the teeth $33^A$ of the driver 33, and the clutch member 31 and shaft 30 will be revolved by the driver 33. $34^D$ is a stop-rod attached to the slider 34. The slider 34 is also provided with rack $34^E$ (see Fig. 21) and meshes with segmental gear 36, forming part of a releasing mechanism, and pivoted upon stud $36^A$, attached to some suitable portion of the framework. (See Figs. 12 and 17.) Pinion 36 is provided with projecting hub $36^B$, having mounted upon its upper end the ratchet $36^C$. The circular disk $36^D$, provided with notches $36^E$, is also mounted independently of the pinion 36 and hub $36^B$, but concentric therewith, and in a manner permitting it to revolve in only one direction. I have not shown details of this mounting, as various forms of mountings which will accomplish the specified result will readily occur to those skilled in the art. The said disk $36^D$ is provided with pawl $36^F$ and spring $36^G$, tending to keep said pawl in engagement with the ratchet $36^C$. 37 is a constantly-revolving shaft suitably mounted in some portion of the framework, and provided with clutch-disk $37^A$ of interior construction similar to that shown in Fig. 6, Sheet 2, being provided with the inwardly-projecting driving-lugs $39^B$ there shown. 38 is an intermittently-revolving shaft independent of the shaft 37, and provided with clutch-disk $38^A$ and cam $38^B$. The clutch-disk $38^A$ is constructed as shown in Figs. 6 and 9 of Sheet 2, being provided with a pawl like the one there shown as $40^E$, having the projection $40^G$ and the spring $40^H$ tending to rotate the said pawl whenever possible, so that it may be engaged by the driving-lug $39^B$. This pawl $40^E$, with projection $40^G$ of Fig. 6, is shown and referred to as $38^C$ in Fig. 21.

The operation of the described mechanism is as follows: Assuming clutch member 31 to be in engagement with its driver 32, a movement of the latch 35, either by hand or by the stop-rod $35^B$, compresses spring $35^A$ and releases slider 34, which is forced to the right by the spring $34^B$ until the clutch-teeth $31^A$ are in engagement with the teeth $33^A$ of the driver 33 and the direction or velocity of shaft 30 is changed, as the case may be. This movement of the slider 34 revolves the pinion 36 slightly, and also the ratchet $36^C$, and as the notched disk $36^D$ is so mounted that it cannot revolve in this direction the engagement of the pawl $36^F$ with the next adjoining ratchet-tooth occurs. The clutch-teeth $31^A$ and $33^A$ are made of proper depth, so that before same can become disengaged by the left-hand movement of the slider 34 the said slider will have traveled approximately one-half of its possible stroke. If the slider 34 be moved to the left by the application of sufficient force to the stop-rod $34^D$ until the clutch-teeth $31^A$ and $33^A$ are disengaged, (forming the first step in the return sliding movement of the clutch member 31,) the pinion 36 will be partially revolved in a direction opposite to its first movement. This movement will also revolve the ratchet $36^C$, and on account of the contact of pawl $36^F$ it will move the notched disk $36^D$ a sufficient distance to release the pawl $38^C$ of the clutch member $38^A$, permitting it to engage with the constantly-revolving driver $37^A$ and to revolve through the notch $36^E$, causing revolution of the shaft 38. During this revolution of shaft 38 the shaft 30 will remain at rest, since the clutch member 31 will occupy the neutral position, out of engagement with both the driver 33 and the driver 32. The described revolution of shaft 38 will also revolve the cam $38^B$, mounted thereon, which will come in contact with the arm $36^H$, suitably attached to the segmental gear 36. Continued revolution of the cam $38^B$ will push the arm $36^H$ aside, revolving the segmental gear 36 partially in the same direction in which it was started by the described left-hand movement or first return step of the slider 34. The segmental gear 36 thus becomes the driver, and by means of the rack $34^E$ the slider 34 will be moved another step to the left, compressing the spring $34^B$, allowing the latch 35 to snap into the depression $34^C$, and causing the engagement of the clutch-teeth $31^B$ and pawls $32^B$ of driver 32. This partial revolution of pinion 36 will have also partially revolved the stop-disk $36^D$, so that the tooth $36^J$ will be in the path of the revolving clutch-pawl $38^C$, mounted in the clutch-disk $38^A$. Upon contact of this pawl with the obstacle thus placed in its path of revolution it will become disengaged from its driver $37^A$ and shaft $38^A$ will come to rest.

It will be seen that the mechanism thus described gives the clutch 31 a continuous spring-pressed sliding movement in the right-hand direction equivalent to its full stroke and a step-by-step sliding movement in the opposite direction, allowing the shaft 30 a period of rest, during which shaft 37 is revolving, and that the said shaft 38 may be utilized as a source of power for the performance of any other function of the machine during its revolution, while the shaft 30 is remaining at rest; also, that the completion of the revolution of the cam $38^B$ will cause the final return of the clutch and slider to the first position.

While the described form of the mechanism shows segmental gear 36 and its attached releasing devices in immediate connection with the slider 34, yet I do not wish to limit myself to this construction, as it will be readily seen that any necessary connecting elements may be introduced between the sliding-clutch member 31 and the segmental gear 36, if it is found more convenient to locate the releasing mechanism at some distance from the clutch, such constructions being within the scope of my improvement. It is unnecessary that the shafts 37 and 38 be independent shafts, as the clutch-driver $37^A$ may be a separate piece loosely mounted upon a prolongation of the shaft 38, if desired. It is also unnecessary that the cam $38^B$ be attached directly to the revolving shaft 38, as it may frequently be desirable to allow the shaft 30 a longer period of rest than would be allowed by a single revolution of the shaft 38. Thus, by mounting the cam $38^B$ upon a separate shaft $38^D$, (see Figs. 19 and 20,) which may be connected by suitable gearing with shaft 38, its velocity may be greatly varied from that of the shaft 38, allowing more or less time for the revolution of the said shaft 38, and consequently a longer or shorter period of rest for the shaft 30, as may be required.

Since the final return step in the movement of the clutch-slider 34 may occur while the constantly-revolving driver 32 is in any position, it is not advisable to provide the said driver and the sliding clutch with positively-engaging teeth similar to the teeth $31^A$ and $33^A$, since the movement of the slider 34 might occur at such a time that the raised portions of the clutch-teeth would abut against each other, preventing proper action of the mechanism and causing damage. It is therefore necessary that these clutch-surfaces should be yielding surfaces so designed as to afford no obstacle to the return of the clutch into engagement therewith in any position of the driver 32. The several drawings illustrating the clutch mechanism show a variety of forms of such yielding surfaces, any yielding surface accomplishing the desired result being an equivalent element of the invention.

The spring-pressed pawls $32^B$, attached to the face of the driver 32, as shown in Fig. 23, in combination with the ratchet-teeth $31^B$ of the clutch member 31, as shown in Fig. 24, constitute one form of such yielding action, it being understood that the end of the sliding-clutch member 31 is beveled off slightly, as indicated at 31$^D$, so that in case the advancing ratchet-teeth are not in proper position to be engaged by the pawls 32$^B$ the said pawls will be raised slightly by the tapered portion of the sliding-clutch member 31, and will seat themselves in contact with the ratchet-teeth of the sliding-clutch member when the driver has revolved sufficiently.

A second form of such yielding clutch-surfaces arranged to operate at each extremity of the sliding motion of clutch member 31 is illustrated in Fig. 13, in which both the clutch driving-hubs are recessed to receive spring-pressed bolts which will be forced back into the body of the clutch-driver in case the advancing sliding clutch does not register properly with the projecting driving-surfaces, the said driving-surfaces being forced out into proper engagement when in suitable relation.

A third form of the necessary yielding surfaces is shown in Fig. 2, in which the clutch-body is provided with oppositely-disposed spring-pressed bolts adapted to yield to end pressure and be forced out into proper engagement with the respective drivers when in a position to register therewith.

Any form of yielding clutch-surface which is most conveniently adapted to other circumstances influencing the proper design of the clutch mechanism is within the scope of my invention, as will be readily understood.

As a result of the use of the spring 34$^B$ for forcing the slider 34 to the right, giving it its first movement, there will of necessity be considerable shock to the mechanism when the clutch member 31 abuts against its driver 33, tending to cause undue wear and damage. The action of the spring may also prove somewhat unreliable. It is therefore desirable to substitute some mechanical means for moving the said slider 34 and the connected clutch to the right, which shall avoid this uncertainty of action, shock, and consequent strain and wear. A form of such a substitute mechanism and some of its details are shown in Figs. 11, 12, 16, and 18, in which cams are used to give the necessary travel to the slider 34. To distinguish these cam movements from the cam movements already described, they are termed the "primary" cam movements. Those already described will hereinafter be termed the "secondary" cam movements. The shaft 30, sliding-clutch member 31, drivers 32 and 33, slider 34, the secondary-cam mechanism, and the releasing devices which allow the same to operate are constructed in the same manner as heretofore described, except that the teeth 31$^A$ of the said clutch do not project as much as in the previously-described form. The primary-cam mechanism referred to is constructed as follows: A constantly-revolving shaft 39 is mounted in some suitably-designed portion of the framework adjacent to the slider 34, and is provided with a constantly-revolving clutch-disk 39$^A$. A second and independent shaft 40 is mounted in such a manner as to be in axial alinement with the shaft 39, and is provided with clutch-disk 40$^A$, releasing-ring 40$^B$, having stop-lugs 40$^C$ and 40$^D$, and containing the pawl 40$^E$, as shown in Fig. 18. The releasing-ring 40$^B$ is provided with an internal notch 40$^F$, which engages the projecting end 40$^G$ of the pawl 40$^E$. A spring 40$^H$ tends constantly to move the stop-ring 40$^B$ slightly in a manner which will cause the engagement of the pawl 40$^E$ with projections 39$^B$ of the constantly-revolving driver. The shaft 40 is also provided with a cam 40$^M$, having the irregularly-shaped cam-groove 40$^N$, adapted to move the slider 34 when revolved. The yoke 34$^A$ of slider 34 is extended, forming projection 34$^F$, and carries a roller 34$^G$, (see Fig. 12,) which projects within the cam-groove 40$^N$, heretofore described. A stop-rod 41 (see Fig. 11) is suitably mounted in the framework, and is provided with stop-collar 41$^A$ and notched releasing-stop 41$^B$, and passes through a recess in the projection 34$^F$ of slider 34.

The operation of the described mechanism is as follows: Assuming the slider 34 and clutch member 31 to be in the left-hand position with the clutch in engagement with its driver 32, pressure upon the stop-rod 41 will act first upon the projection 34$^F$ of the slider 34 because of the contact of stop-collar 41$^A$ with the said projection 34$^F$ and will move the said slider 34 slightly to the right, it being understood that the contour of the cam-groove 40$^N$ where it engages the roller 34$^G$ is so shaped as to permit the said movement of slider 34. Continued movement of the stop-rod 41 will cause the clutch member 31 to become disengaged from its driver 32 and will stop the revolution of shaft 30. This movement toward the right of the stop-rod 41 will have also moved the notched releasing-stop 41$^B$, attached thereto, to the right until the notch 41$^C$ in the said releasing-stop permits the passage of the projecting releasing-lug 40$^C$. So soon as the stop-ring 40$^B$ is thus released it will revolve slightly by the action of the spring 40$^H$, (see Fig. 18,) and the pawl 40$^E$ will become engaged with the projection 39$^B$ of the constantly-revolving driver 39$^A$, and the shaft 40, with its attached cam 40$^M$, will revolve until the second stop-lug 40$^D$ of the stop-ring 40$^B$ comes in contact with shoulder 41$^D$, which has been advanced toward the right into the path of the revolution of the said stop-lug 40$^D$ by the movement of rod 41. The obstacle thus placed in the path of the revolution of the said stop-lug 40$^D$ will retard the ring 40$^B$, disengaging the pawl 40$^E$ from its driver and allowing the revolution of the shaft 40 to cease. The contour of the cam-groove 40$^N$ is such that this partial revolution of the cam 40$^M$ will move the slider 34 its full stroke toward the right, causing the engagement of clutch-teeth 31$^A$ with the teeth of the driver 33. The projection 34$^F$ of the slider 34 will have then also moved to the right a sufficient distance to abut against the releasing-stop 41$^B$, (see Fig. 16,) and shaft 30 will be revolved in the opposite direction, or at a different velocity, as the case may be. If sufficient pressure be now applied to the stop-rod 41 in the opposite direction or toward the left, the slider 34 will be first moved with the said stop-rod slightly to the left until the clutch-teeth $31^A$ are disengaged from its driver 33, stopping the revolution of shaft 30. The primary-cam mechanism will also be again released by the notched releasing-stop $41^B$, and the cam $40^M$ will make a second partial revolution until stopped by the contact of the lug $40^C$ with the shoulder $41^E$, as before explained. The contour of this portion of the cam-groove $40^N$ is so made that this second partial revolution of the said cam will withdraw the slider only a portion of the total amount of its travel (forming the first return step in the movement of the clutch 31) and the slider will remain in the middle position when the primary-cam mechanism comes to rest the second time, allowing the shaft 30 to remain at rest. The secondary-cam mechanism will be released by the return of the slider to the middle position, as described in the first form of the mechanism, allowing the performance of some other function by the revolution of the shaft 38 while shaft 30 remains at rest, as before described, and the said slider 34 will be finally returned to the left-hand position, as shown in Fig. 11, by the completion of the action of the secondary-cam mechanism. The sliding-clutch member 31 will thus be mechanically controlled, having a continuous sliding motion in one direction, caused by the action of the primary-cam mechanism, and a step-by-step sliding motion in an opposite direction, caused by the described action of both the primary and the secondary-cam mechanisms.

It will be seen that the primary-cam mechanism may be located at any convenient distance from the slider 34 by the interposition of necessary connecting-links, if the design of the machine renders this removal of the mechanism convenient, within the scope of the invention. It will also be seen that the cam $40^M$ may be mounted on a separate shaft connected by gearing with the intermittently-acting clutch $40^A$, if desired. Other variations in the constructive details of the primary-cam mechanism are possible within the scope of my invention, the arrangement described being a compact form and including only the necessary elements for its proper action.

A further modification of the improved clutch mechanism is shown in Figs. 1, 2, 3, 4, 5, 6, 7, 8, 9, and 10, in which a rock-shaft, connected to the sliding clutch by means of a gear-segment and rack-teeth and intermittently-acting mechanism for rocking the said shaft to give the clutch its proper sliding movements, are substituted for the guiding-slider 24, yoke $34^A$, and primary-cam mechanism of the form previously described. This latter form is the special form of clutch mechanism embodied in the improved gear-cutting machine described in my application for patent, filed February 28, 1894, Serial No. 501,864. In this modified form of the mechanism the clutch-body 31 is provided with recesses, in which oppositely-disposed spring-pressed bolts $31^E$ are fitted, and retained in place by bands $31^F$. The clutch-body 31 is also surrounded by a band $31^G$, provided with rack-teeth $31^H$ and projection $31^J$, by which said band is prevented from revolving with the clutch-body. 42 is a rock-shaft suitably mounted in the framework of the machine, provided with gear-segment $42^A$, which meshes with the rack-teeth $31^H$. (See Fig. 5.) Referring to Figs. 6 and 7, $39^C$ represents a constantly-revolving shaft, suitably journaled in the framework parallel to the rock-shaft 42, and corresponding in function to the shaft 39 of the primary-cam mechanism of Figs. 11 and 16, previously described. Attached to the said shaft $39^C$ is a clutch-driver $39^D$, provided with internal lugs $39^E$. Loosely mounted upon said shaft $39^C$, adjacent to the clutch-driver $39^D$, is an intermittently-revolving element $40^R$, provided with pawl $40^E$, having projection $40^G$ and spring $40^H$. Said element $40^R$ is also provided with gear-teeth $40^S$ and annular groove $40^T$. (See Fig. 10.) Referring to Fig. 6, the rock-shaft 42 is provided with a rigidly-attached arm $42^B$, having extensions $42^C$ and $42^D$ and the relatively wide opening $42^E$. It has also projection $42^F$, in which is mounted roller $42^G$. Suitably journaled within the framework adjacent to the arm $42^B$ is an intermittently-revolving element 43, having gear-teeth $43^A$, which mesh with the gear-teeth $40^S$ of the element $40^R$, as shown in Figs. 6 and 7. The said revolving element 43 is also provided with an eccentrically-mounted stud or roller $43^B$, which projects within the opening $42^E$ of the arm $42^B$. Suitably pivoted upon the stud $44^A$ in the framework at a proper distance from shaft $39^C$ is an escapement-lever 44, to which stop-rod $44^B$ is attached. Said escapement-lever 44 is provided with escapement-points $44^C$ and $44^D$, which are adapted to engage and release the projecting portion $40^G$ of the pawl $40^E$. The escapement-lever 44 is also provided with an extension $44^E$, adapted to engage with the projections $42^C$ and $42^D$ of the element $42^B$. Suitably mounted within the framework at right angles to the rock-shaft 42, but not intersecting same, is an intermittently-revolving shaft $38^D$, provided with cam $38^B$, the said shaft $38^D$ and cam $38^B$ being an equivalent of the secondary-cam mechanism heretofore described.

The operation of this third form of the improved clutch mechanism is as follows: It being assumed that the clutch 31 is in the left-hand position in engagement with its driver 32, the mechanism for moving the rock-shaft will be in the position shown in Fig. 6. If sufficient pressure be now applied to the stop-rod $44^B$ in a direction to move it toward the left, the escapement-lever 44 will be revolved slightly about its pivot 44$^A$, and the projection 44$^E$ being in contact with projection 42$^D$ of the rock-shaft element 42$^B$ the rock-shaft 42 will also be partially revolved, causing the sliding clutch 31 to move slightly toward the right and withdrawing its teeth from those of its driver 32. The described movement of the escapement-lever 44 will have also moved the escapement-lever projection 44$^D$ to the right to a sufficient distance to free the projecting end 40$^G$ of the pawl 40$^E$, when the spring 40$^H$ will have moved the said pawl, causing it to engage the projection 39$^B$ of the constantly-revolving driver 39$^D$. The element 40$^R$ will then make a partial revolution until its motion is arrested by the contact of the pawl 40$^G$ with the escapement-point 44$^C$, which will have also been moved to the right into the path of the said pawl. Through the action of the gear-teeth 40$^S$ and 43$^A$ the element 43 and its projecting eccentric-roller 43$^B$ will have also been revolved partially, and the contact of the said roller 43$^B$ with the wall of the opening 42$^E$ will have given the rock-shaft 42 a further rocking movement, causing the sliding clutch 31 to move farther to the right until its teeth have become engaged with the teeth of the driver 33, changing the velocity or reversing the direction of the shaft 30, as the case may be. If sufficient pressure be now applied to the stop-rod 44$^B$ in the opposite direction, or toward the right, the described action will be reversed. The contact of the extension 44$^E$ of the escapement-lever 44 with the projection 42$^C$ of the rock-shaft element 42$^B$ will rock same slightly in the opposite direction, or toward the left, withdrawing the teeth of the sliding clutch from contact with those of the driver 33 and permitting the shaft 30 to stop revolving. The described movement of the escapement-lever 44 will also swing the escapement-point 44$^C$ out of the path of the projecting pawl, permitting it to engage with its constantly-revolving driver, and revolve partially until again stopped by its contact with the projection 44$^D$, which will have been swung into its path of revolution. This partial revolution will cause the revolving element 43 to make a corresponding partial revolution, and the contact of the eccentric-roller 43$^B$ with the opposite wall of the opening 42$^E$ in the rock-shaft arm 42$^B$ will move same still farther to the left; but on account of the relatively wide opening 42$^E$ in the rock-shaft arm 42$^B$ the said rock-shaft 42 will be caused to revolve only a portion (approximately one-half) of the angular movement necessary to return the sliding-clutch mechanism 31 to its extreme left-hand position in engagement with its driver 32. This partial revolution of the rock-shaft 42 will also serve to release the secondary-cam mechanism, setting in motion shaft 38$^D$ and cam 38$^B$. Contact of the said cam 38$^B$ with the roller 42$^G$ of the rock-shaft element 42$^B$ will move the rock-shaft 42 a farther distance, causing the sliding-clutch mechanism 31 to move to its extreme left-hand position in engagement with its driver 32 and starting the revolution of the shaft 30, the working parts returning to the position shown in Fig. 6. In this form of the improved clutch mechanism the rock-shaft 42, besides serving to move the clutch mechanism 31, also corresponds in function with the element 36$^B$ of the secondary-cam mechanism, as shown in Fig. 17, the construction of the secondary-cam-mechanism-releasing devices being varied in details sufficiently to permit this combination of effects, as shown in complete detail in the drawings forming part of the patent application already referred to.

It may be mentioned that a further advantage exists in sliding the clutch mechanism 31 mechanically from one to the other of its drivers. The described movements of the stop-rods 41 of Figs. 11 and 16 and 44$^B$ of Figs. 6 and 7 serve, first, in each case to release the engagement of the teeth of the sliding clutch with the respective drivers and afford means for positively determining the time when the shaft 30 shall cease to revolve. In that form of the mechanism first described, in which the slider 34 is moved in one direction by the action of the spring 34$^B$, the movement of the stop-rod serves only to release the retaining-latch and does not positively determine the time when the revolving shaft 30 shall stop, since this depends entirely upon the prompt or sluggish action of the spring 34$^B$.

I do not wish to limit myself to the use of the specifically-described forms of intermittent clutches in operating the primary and secondary cam mechanisms, since it is obvious that any other forms of intermittently-acting clutches by which the several elements may be given partial or complete revolutions as required will be equivalent devices.

It is not essential that the sliding clutch 31 be mounted between the drivers 32 and 33, as shown, since equivalent effects may be produced by the use of a series of clutches and drivers and alterations in the construction of the clutch-slider 34, whereby the same may be made to meet the changed conditions.

It is also possible within the scope of my invention to provide a series of steps in the movement of the said clutch-slider in each direction, if demanded by any peculiar function of the shaft upon which the clutch mechanism is mounted, as such a series of step movements may be accomplished by a corresponding series of cam mechanisms similar to the secondary-cam mechanism herein described.

Having thus described my improvement and some equivalent variations in the details of its application, I claim as new and desire to secure by Letters Patent—

1. In combination, a shaft, clutch-drivers loosely mounted thereon, a slidable clutch member splined on said shaft and adapted to engage said drivers, clutch-operating mechanism consisting of primary means for moving the slidable clutch member from engagement with one driver into engagement with the opposite driver, secondary means for returning the slidable clutch member to its neutral position, tertiary means substantially as described for returning said slidable clutch member to its initial position, and mechanism intermediate said secondary and tertiary means for setting in operation the latter, substantially as set forth.

2. In clutch mechanism, the combination with a shaft, of revolving drivers loosely mounted upon the said shaft and provided with clutch-surfaces, a sliding-clutch mechanism mounted upon the said shaft and adapted to engage with the said drivers, a slider or guide engaging the said sliding-clutch mechanism, a pinion for moving the slider, an intermittingly-movable notched disk connected with the pinion, whereby the pinion is adapted to move the said slider or guide in a series of step-by-step movements, and releasing devices for setting the said disk and pinion in action, substantially as described.

3. In combination, clutch-sliding mechanism consisting of a spring-actuated slider 34 tending to move always in one direction, primary means, as stop-rod 34$^B$, for first moving the said slider a shorter distance in the opposite direction, secondary means, as releasing-disk 36, intermittently-acting cam 38$^B$, and mechanism connecting the said cam and the said slider for continuing the shorter movement of the said slider, and means, as latch 35, for retaining and releasing the said slider, substantially as described.

4. In combination, clutch-sliding mechanism consisting of a slider 34, means, as stop-rod 41 and attached stop-collars 41$^A$ 41$^B$ for moving the said slider partially in either direction, and means, as intermittently-acting cam 40$^M$ for continuing the movement of the said slider in either direction, so organized as to move the said slider farther in one direction than in the opposite direction, substantially as described.

5. In combination, clutch-sliding mechanism consisting of slider 34, means, as stop-rod 41 and attached stop-collars 41$^A$ 41$^B$ for moving the said slider partially in either direction, means, as intermittently-acting cam 40$^M$ for continuing the movement of the said slider in either direction, so organized as to move the said slider farther in one direction than in the opposite direction, and means, as releasing-disk 36, intermittently-acting cam 38$^B$ and mechanism connecting the said cam and the said slider, for continuing the shorter movement of the said slider, substantially as described.

LUCIUS E. WHITON.

Witnesses:
 FRANK H. ALLEN,
 ALONZO M. LUTHER.